United States Patent
MacNeil

(12) 
(10) Patent No.: US 6,892,912 B1
(45) Date of Patent: May 17, 2005

(54) ROOF TOP CARRIER WITH STRAP ATTACHMENT LOOPS

(76) Inventor: David F. MacNeil, 205 E. Sixth St., Hinsdale, IL (US) 60521

(*) Notice: Subject to any disclaimer, the term of this patent is extended or adjusted under 35 U.S.C. 154(b) by 312 days.

(21) Appl. No.: 10/293,748

(22) Filed: Nov. 13, 2002

(51) Int. Cl.$^7$ .................................................. B60R 9/00
(52) U.S. Cl. ........................ 224/318; 224/319; 224/328; 224/572
(58) Field of Search ................................ 224/572, 318, 224/319, 328, 401, 404, 413, 433, 436, 437

(56) References Cited

U.S. PATENT DOCUMENTS

| | | |
|---|---|---|
| 2,196,341 A | 4/1940 | Rush |
| 2,684,796 A | 7/1954 | Swenson |
| 2,812,992 A | 11/1957 | Lysen |
| 3,000,418 A | 9/1961 | Bitting |
| 3,000,419 A | 9/1961 | Morrison |
| 3,095,129 A | 6/1963 | Kerr |
| 3,143,264 A | 8/1964 | Spero |
| 3,228,575 A * | 1/1966 | Peterson ..................... 224/328 |
| 3,339,607 A * | 9/1967 | Howard .................... 206/315.1 |
| 3,583,613 A | 6/1971 | Gish |
| 3,670,934 A | 6/1972 | Kraselsky |
| 4,050,614 A | 9/1977 | Simpson |
| 4,108,342 A | 8/1978 | Riva |
| 5,033,497 A * | 7/1991 | Hernandez ..................... 135/95 |
| D319,422 S * | 8/1991 | Tyner ........................ D12/413 |
| 5,096,107 A * | 3/1992 | VanSon ....................... 224/328 |
| 5,288,003 A | 2/1994 | MacDonald |
| 5,358,162 A | 10/1994 | Hill |
| 5,538,169 A | 7/1996 | Moore |
| 5,738,262 A | 4/1998 | Andrini |
| 5,947,354 A | 9/1999 | Williams |
| 6,209,768 B1 | 4/2001 | Boaz |
| 6,230,951 B1 * | 5/2001 | Anderson ................... 224/585 |
| 6,244,482 B1 | 6/2001 | Gyarmaty |
| 6,257,470 B1 | 7/2001 | Schaefer |
| 6,318,612 B1 | 11/2001 | MacNeil |

* cited by examiner

*Primary Examiner*—Stephen K. Cronin
(74) *Attorney, Agent, or Firm*—Jefferson Perkins; Daspin & Aument, LLP

(57) ABSTRACT

A carrier that stores cargo on a vehicle includes a plurality of elongate flexible loops with first and second ends that are affixed to the carrier in a spaced relation to each other. Each loop is laterally offset from the longitudinal axis of the carrier and is positioned near the front or back of the carrier. At least one strap is secured to the loop intermediate the first and second ends. The strap secures the carrier to the vehicle in any of several orientations.

22 Claims, 5 Drawing Sheets

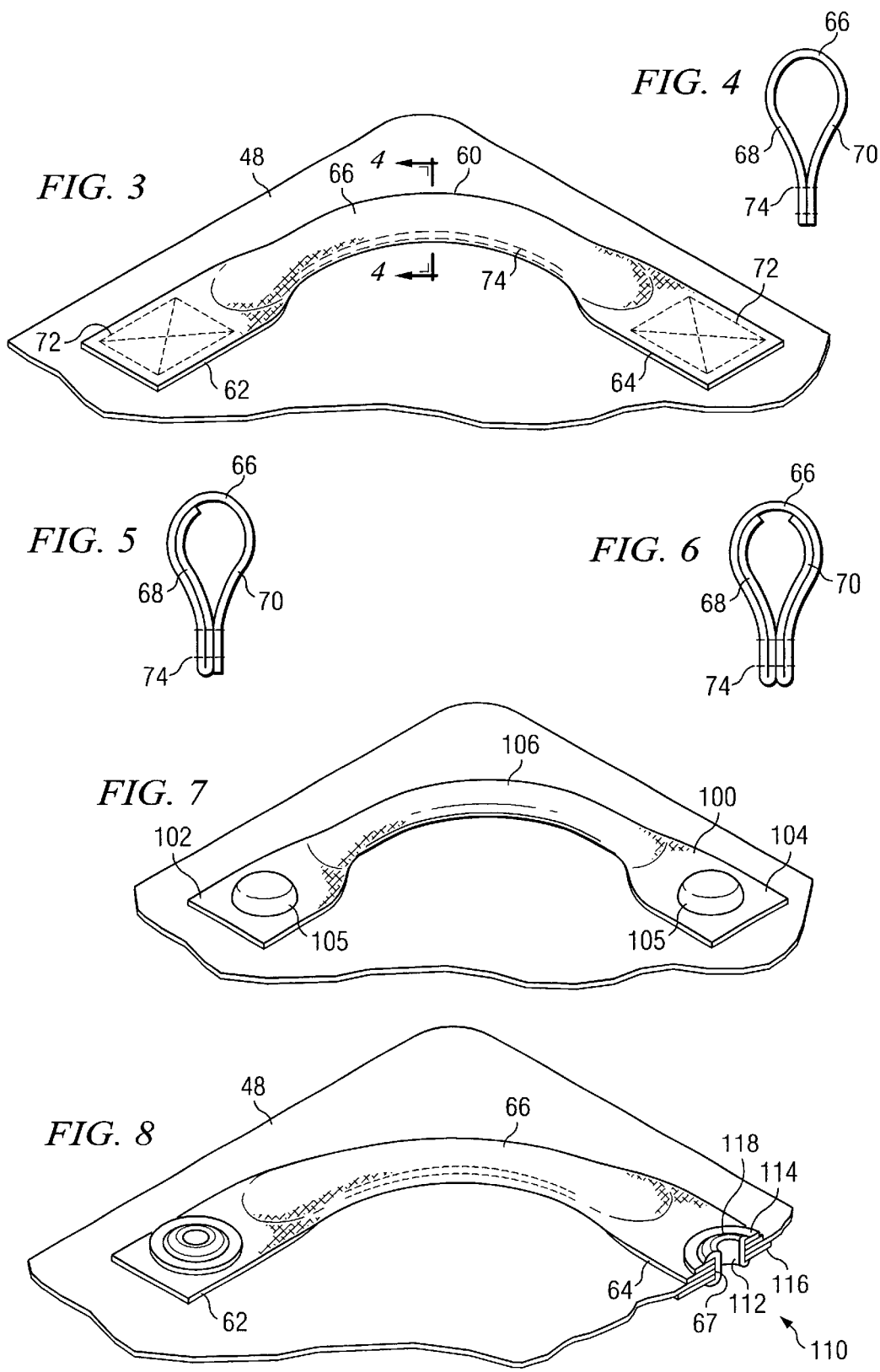

US 6,892,912 B1

ROOF TOP CARRIER WITH STRAP ATTACHMENT LOOPS

TECHNICAL FIELD OF THE INVENTION

The present invention relates in general to a luggage carrier attached to the roof of a vehicle, and more particularly to a roof top carrier with strap attachment loops that provide a secure connection between the carrier and the vehicle.

BACKGROUND OF THE INVENTION

When individuals travel from one location to another by automobile or other vehicle, there is often a need for additional cargo space that cannot be found inside the vehicle. A standard solution to this problem has been a car-top carrier that fits on the top of the vehicle and is capable of storing items of various sizes. While these carriers are effective at holding cargo, it is important that the carriers are secured tightly, otherwise the carrier could become loose and either damage the top portion of the vehicle or fall off the vehicle entirely. The carriers must therefore be tied down to the vehicle in some manner.

Some carriers are made of cloth or other pliable material, are collapsible when not in use, and are tied to the vehicle using buckles and straps. Certain carriers use bolts, brackets and the like; these carriers tend to be hard-shelled and, through use of various attachment hardware, are customized to fit to a particular vehicle model. A standard practice for tying down cloth carriers is to use a length of belting that is stitched to the car-top carrier and run through a railing on the top of the vehicle. The user then buckles the strap to itself and cinches it tight.

One end of the strap is stitched to the carrier at a single location while the opposite end is attached to the vehicle. The single stitched connection of the strap is under a tensile stress when the carrier is attached to the vehicle. If the stress is too severe, as may happen when wind attempts to shear the carrier off the vehicle or the contents shift, the strap may tearway from the carrier. As a result, the strap may no longer be able to secure the carrier to the vehicle. The strap extends from the carrier in one preferred direction, and varying this direction will cause the carrier wall to crease or wrinkle and will increase the stress on the stitching between the strap and the cloth carrier wall. Hence, tying a strap to the carrier in other than the preferred direction may also cause separation failure.

Therefore there is a need to provide an attachment device for the fastening strap that will ensure a secure connection between a cargo carrier and a portion of a moving vehicle. There is also a need to provide an attachment device which permits the strap to be attached to a range of different points on the vehicle in different directions from the carrier.

SUMMARY OF THE INVENTION

According to one aspect of the invention, a carrier is provided for storing cargo on a vehicle. The carrier has a substantially flat surface with a plurality of corners. At least one elongated loop with a first end and a second end is affixed to the flat surface of the carrier. The first and second ends are affixed near one of the corners of the carrier. At least one strap is secured to the elongated loop between the first and second ends. The strap attaches the carrier to the vehicle. Preferably, a loop is affixed near each corner of the carrier.

According to another aspect of the invention, a cargo carrier for a vehicle is provided which has a front and a back and is formed along a longitudinal axis between the front and the back. The carrier also includes sides that are disposed between the front and the back and laterally of the longitudinal axis. A wall defines an external surface of the carrier, which can be polyhedral or rounded to various extents, and which can be flexible or rigid. A plurality of elongate flexible loops are affixed to the carrier. Each loop has a first end and a second end which are affixed to the wall in a spaced relation to each other. Each loop is positioned on the wall laterally offset from the longitudinal axis and near the front or back of the carrier. At least one strap is secured to each loop intermediate the first and second ends. The straps secure the carrier to the vehicle.

BRIEF DESCRIPTION OF THE DRAWINGS

Further aspects of the invention and their advantages may be discerned from the following description when taken in conjunction with the drawings, in which like characters number like parts and in which:

FIG. 3 is an isometric detail view of the strap attachment loop stitched to the roof top carrier illustrated in FIG. 1;

FIG. 4 is a cross sectional view taken substantially along line 4—4 of FIG. 3;

FIG. 5 is a cross sectional view of an alternative embodiment of an intermediate section of a strap attachment loop;

FIG. 6 is a cross sectional view of an alternative embodiment of an intermediate section of a strap attachment loop;

FIG. 7 is an isometric view of an alternative strap attachment loop of the present invention;

FIG. 8 is an isometric view of the strap attachment loop secured to the carrier by a fastener;

DETAILED DESCRIPTION

Figure 1:
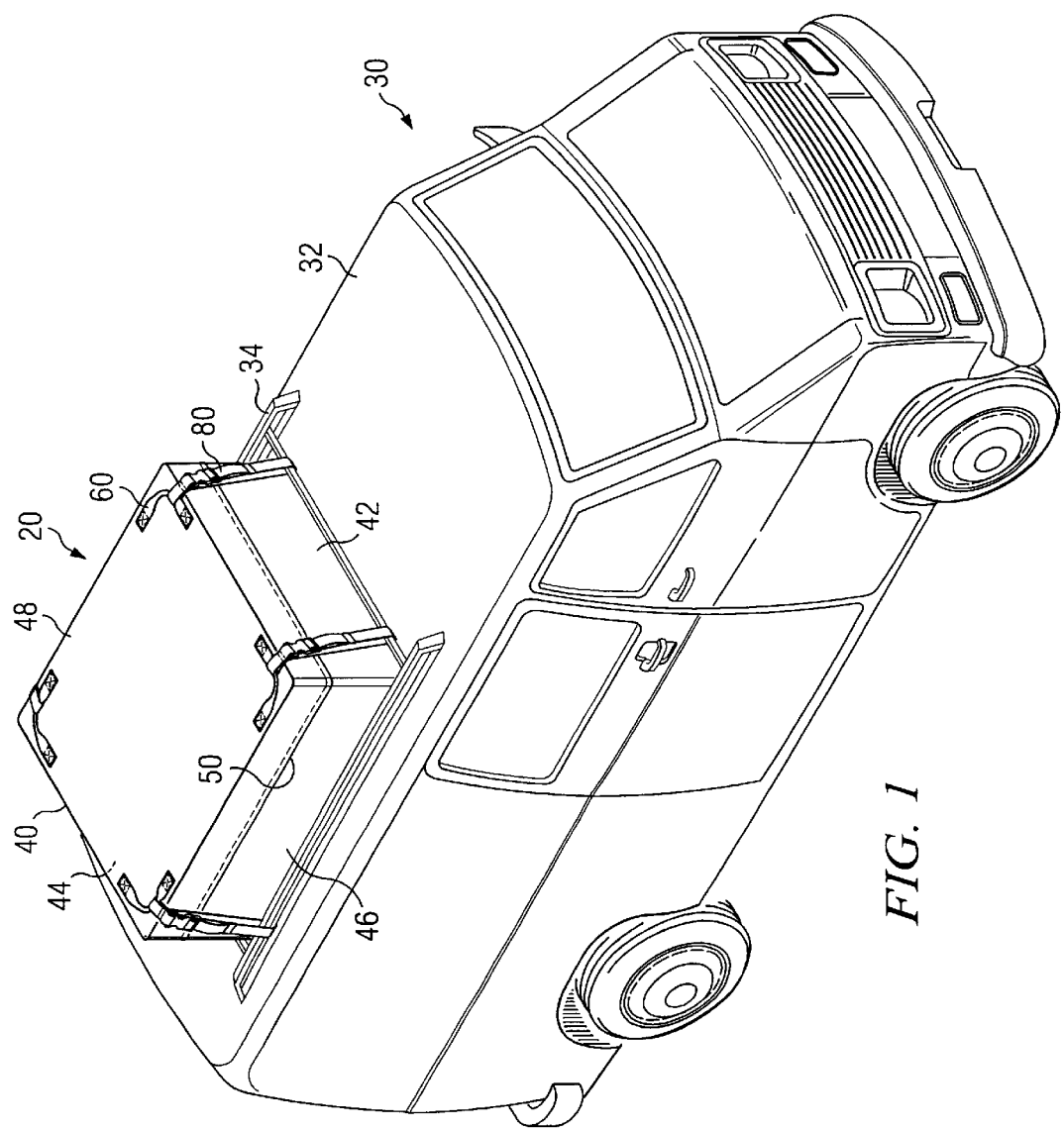
FIG. 1 is an isometric view of the roof top carrier with strap attachment loops installed on a vehicle.

As shown in FIG. 1, a roof top carrier shown generally at 20 is secured to a vehicle 30. The roof top carrier shown in FIG. 1 is substantially polyhedral in form and includes a front 42, rear 44 and sides 46. A wall defines the external surface of the carrier. The external surface may include a top flat surface 48, as shown in FIG. 1, or it may include a curved surface (see FIG. 10). The carrier also includes an opening 50 that is typically closed by a fastener such as a zipper. In the illustrated embodiment, the opening 50 extends along one side 46 as well as the front 42 and rear 44 of the carrier. As a result, the consumer is able to open the top portion of the carrier to install their cargo. After the cargo is installed, the user closes the top portion of the carrier and seals the opening 50 with the zipper.

The roof top carrier of the present invention preferably is made from a 1800 denier woven polyester fabric. A water repellent PVC coating is applied to the carrier to protect the contents of the carrier from various environmental elements, such as rain. The underside of the carrier includes a soft thick fleece pad to protect the finish of the vehicle when the carrier is attached to the roof 32 of a vehicle 30.

The roof top carrier also includes a plurality of strap attachment loops 60, each with at least one strap 80 attached thereto. Typically, a strap attachment loop 60 is affixed near each corner or end of the carrier. As illustrated in FIG. 1, the carrier is secured to the vehicle such that at the front of the carrier, straps secure the carrier to the rack 34 at the front of the vehicle and at the rear of the carrier, straps secure the carrier to the rack 34 along the sides of the vehicle. Since the front of the carrier is secured to the vehicle, the carrier is able to resist the high winds due to the vehicle's speed on the highway. The user may, however, easily vary the strap attachment pattern to best adapt the carrier to the vehicle.

Figure 2:
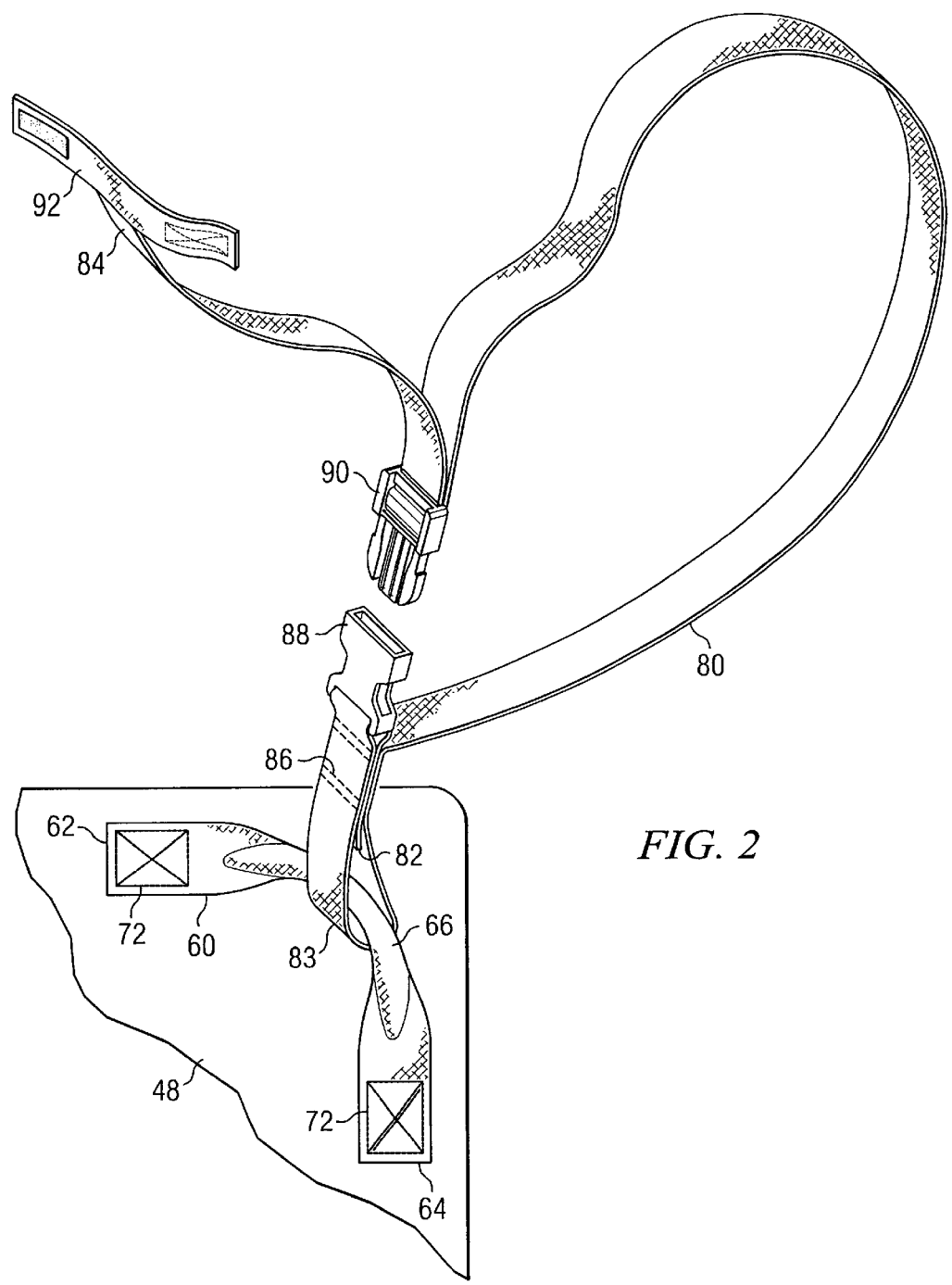
FIG. 2 is an isometric detail view of a strap attachment loop of FIG. 1, showing a strap secured thereto.

The strap attachment loop and strap of the present invention are illustrated in detail in FIG. 2. The strap attachment loop 60 preferably is formed from an elongated piece of a textile. The loop includes a first end 62 and second end 64 with an intermediate section 66 therebetween. The intermediate section 66 forms an attachment area where the strap 80 is secured to the loop 60.

The first and second ends 62, 64 of the loop 60 are affixed to the top flat surface 48 of the carrier. As illustrated in FIGS. 2 and 3, preferably each end 62, 64 is affixed to the carrier by stitching, particularly where the carrier wall is formed of cloth. A square is stitched at each end of the loop to affix the loop to the carrier. Additionally, within each stitched square, two diagonal lines are stitched thereby forming an "X" shape that is enclosed within the square. This stitching pattern 72 provides a secure connection between the loop 60 and the top flat surface 48 of the carrier. Alternative stitching patterns may also be used to secure the loop to the carrier.

The intermediate section 66 is also stitched to provide a thickened, less wide region for the strap 80 to attach to the loop 60. FIG. 4 illustrates a typical stitch pattern of the intermediate section 66. The intermediate section 66 of the loop is longitudinally folded upon itself thereby forming a first side 68 and a second side 70. The first and second sides 68, 70 are adhered to each other as by stitching 74. As shown in FIGS. 5 and 6, the intermediate section may be folded in an alternative configuration. FIG. 5 illustrates the intermediate section 66 longitudinally folded upon itself with one side 68 of the intermediate section folded a second time. The sides 68, 70 of the elongate loop are then adhered to each other as by stitching 74. FIG. 6 illustrates an additional alternative configuration where the intermediate section 66 is longitudinally folded upon itself. Next, the first and second sides 68, 70 are each folded inward towards the interior of the original folded intermediate section. The sides 68, 70 are adhered to each other as by stitching 74 to form the intermediate section. Folding the intermediate section onto itself and stitching causes the strap load to be more equally distributed across the loop cross section and therefore communicated more evenly to the stitched loop ends. The loops therefore become more resistant to tear-out.

The strap attachment loop may be positioned at various locations on the external surface of the carrier. In the illustrated embodiment of FIG. 1, the ends of the strap attachment loop are affixed to the top flat surface 48 near the corners of the carrier. Preferably, one strap attachment loop is affixed near each corner. The first end 62 of the strap attachment loop is oriented on the carrier perpendicular to the second end 64. This allows the intermediate section to have portions which are parallel to both the front or rear and the side of the carrier. As discussed below, this orientation of the intermediate section enables the user to slide the strap to various locations along each strap attachment loop.

As shown in the illustrated embodiments, at least one strap 80 is attached to each strap attachment loop 60. The straps are made of a nylon webbing, although other flexible materials could be used, such as other woven fabrics, plastic or leather. The straps are preferably approximately 1½ inches wide. Each strap 80 also includes a fastening means. The fastening means preferably includes corresponding female and male components 88, 90 of a buckle. The buckle is the primary device for securing the carrier to the vehicle. Although a plastic buckle formed from delrin is preferred in the invention for its relative ease of manufacture and use, other fastening means such as rings, clips, or other devices that are well known in the art could be used.

The strap includes a first end 82 and a second end 84. The first end 82 of the strap wraps around the intermediate section 66 of the strap attachment loop 60 and is threaded through a portion 88 of female component of the buckle. The strap is then folded over so as to cover the first end. The strap 80 is adhered to the first end 82 by stitching 86, as shown in FIG. 2. The second end 84 of the strap is threaded through the male component 90 of the buckle. A cross-piece 92 may also be affixed to the second end, as described in commonly assigned U.S. Pat. No. 6,318,612. As shown in FIG. 1, the straps 80 wrap around the vehicle rack 34. The male and female components 88, 90 of each buckle are attached and the second end 84 of the strap is cinched by pulling the second end downwards. As a result, the straps 80 secure the carrier to the vehicle.

As shown in FIG. 2, when the strap 80 is looped around the intermediate section 66 of the strap attachment loop 60, a portion of the strap forms a loop 83 around the strap attachment area that is slightly slacked. As a result, the strap is slidably moveable between a longitudinal orientation and a lateral orientation. In the longitudinal orientation, the strap is able to secure the carrier to a point on the rack at the front or rear of the vehicle. In the lateral orientation, the strap is able to secure the carrier to a point on the rack at the side of the vehicle.

Alternatively, as shown in FIG. 7, the strap attachment loop may be molded from a hard rubber substance instead of being formed from a textile. The alternative strap attachment loop 106 is affixed to the carrier by fasteners 105. The alternative strap attachment loop would be molded so as to provide an intermediate section that allows a strap to slidably move between a longitudinal and lateral orientation.

The textile strap attachment loop of the present invention may also be secured to the carrier by a fastener, such as a rivet. As shown in FIG. 8, the carrier wall may include a plurality of holes 112 in the flat surface of the carrier sized to receive a rivet 118. In this configuration, the strap attachment loop would also include a hole 67 through each end 62, 64 of the loop 60. The strap attachment loop would then be positioned over the holes 112 in the flat surface of the carrier. A washer 114, 116 would be placed on top of the loop as well as underneath the carrier to protect the carrier from being ripped by the fastener. A rivet 118 is then installed within the hole to secure the loop to the carrier.

Figure 9:
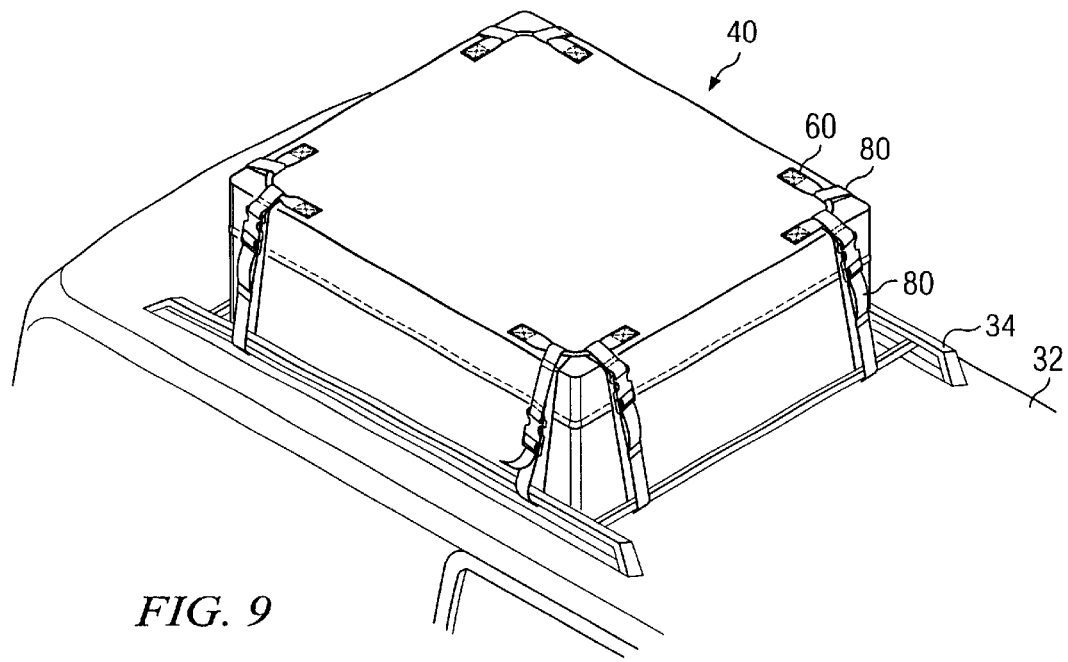
FIG. 9 is an isometric view of the roof top carrier with strap attachment loops of FIG. 1 with two straps attached to each attachment loop.

Additionally, more than one strap may be attached to each strap attachment loop. In the embodiment illustrated in FIG. 9, each strap attachment loop on the carrier includes two straps secured to the loop. As a result, when the carrier is installed on the vehicle, the straps attach the carrier at either the front and sides or the rear and sides of the carrier. The extra straps increase the stability of the carrier on the vehicle. It is generally found that the additional straps are useful when the load in the carrier is at or near a maximum.

Figure 10:
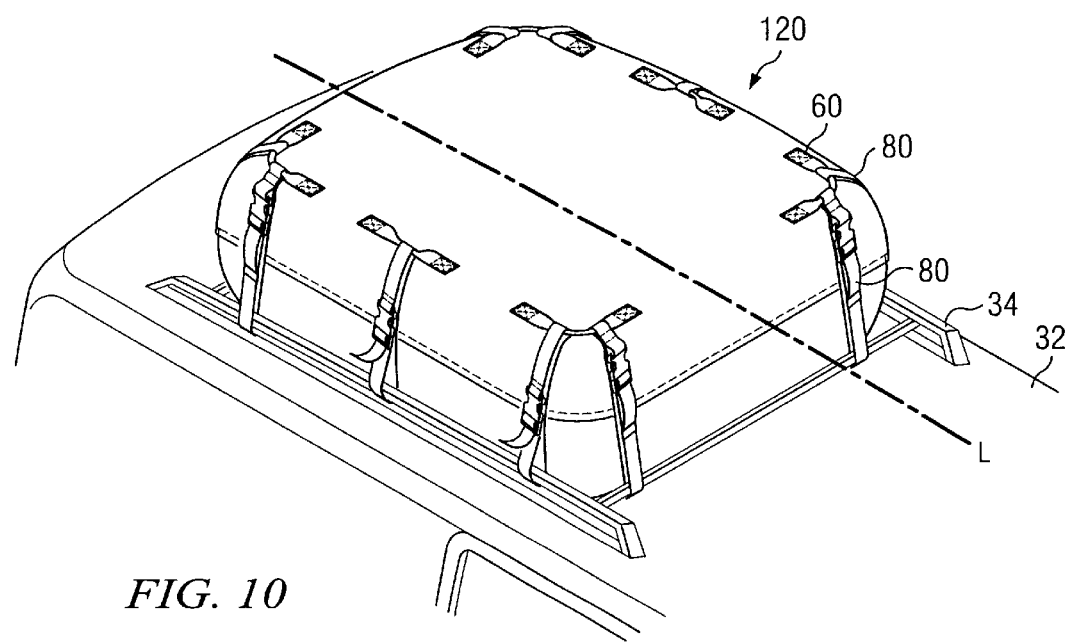
FIG. 10 is an alternative isometric view of a curved roof top carrier with the strap attachment loops of the present invention.

As show in FIG. 10, the strap attachment loops of the present invention may also be attached to various shaped carriers. For example, a carrier with a rounded or more aerodynamic shape may be formed along a longitudinal axis L between the front and rear of the carrier with sides that extend between the front and rear and laterally from the longitudinal axis L. The strap attachment loops are affixed to the carrier laterally offset from the longitudinal axis of the carrier. Strap attachment loops are generally affixed near the front or back of the carrier. Preferably, two strap attachment loops are attached to both the front and the back of the carrier. Additional strap attachment loops may also be affixed along the side of the carrier to enable an additional strap to secure the carrier to the vehicle.

Figure 11:
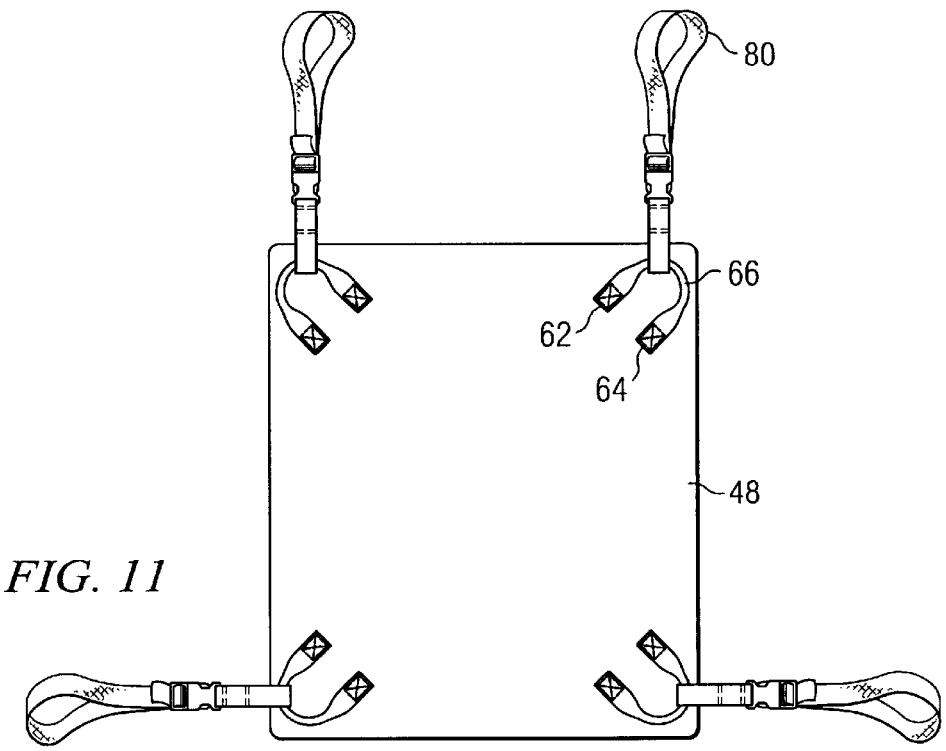
FIG. 11 is an isometric view of an alternative orientation of the strap attachment loops affixed to the carrier.
Figure 12:
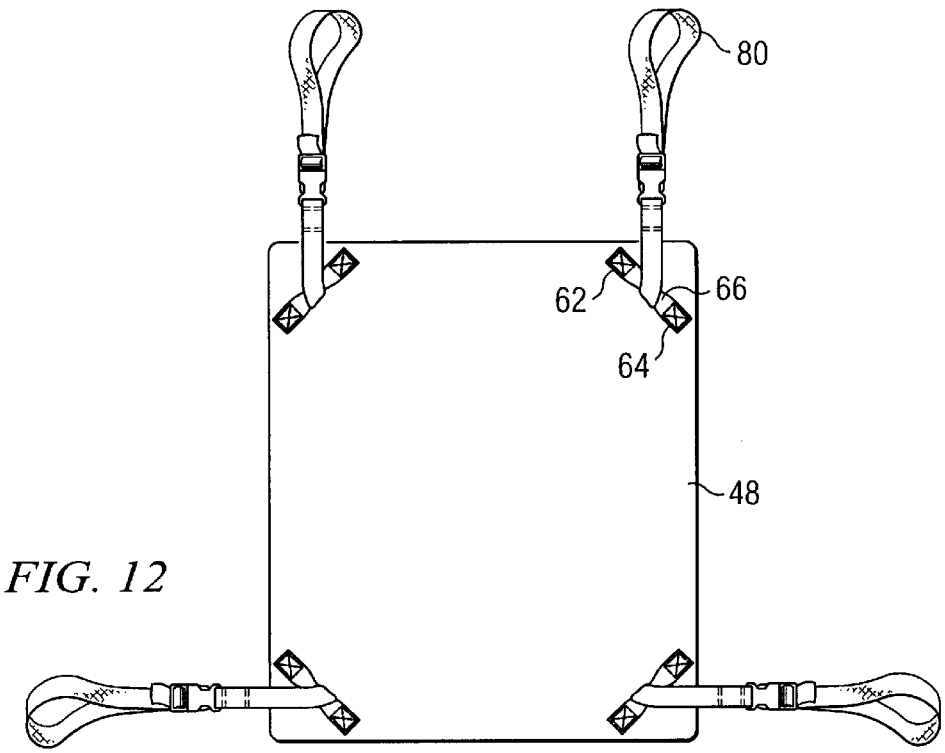
FIG. 12 is an isometric view of an alternative orientation of the strap attachment loops affixed to the carrier.

Alternatively, as illustrated in FIG. 11, the first and second ends 62, 64 of the strap attachment loop 60 may be affixed to the carrier at an angle with respect to the edges that form the corners of the carrier. In this arrangement, the intermediate section 66 would be oriented to extend towards the corner thereby forming a "U" shape. The strap attachment loop may be oriented such that the intermediate section 66 extends diagonally across the carrier in a straight line from the first end 62 to the second end 64, as shown in FIG. 12.

In summary, a roof top carrier with strap attachment loops has been described and illustrated which permits the user to attach secure the carrier to a vehicle using any number of different strap orientations. However, while the invention has been described with respect to the illustrated embodiment, it is not limited thereto, but only by the scope and spirit of the appended claims.

I claim:

1. Apparatus for storing cargo on a vehicle, the apparatus comprising:
   a carrier having a substantially flat surface, the surface having a plurality of corners;
   at least one elongated loop having a first end and a second end, the first and second ends being affixed to the substantially flat surface near one of the corners thereof; and
   at least one strap adapted to attach the carrier to the vehicle, the strap secured to the elongated loop between the first and second ends thereof.

2. The apparatus of claim 1, wherein the first end is oriented on the surface to be perpendicular to the second end.

3. The apparatus of claim 1, wherein the surface has edges meeting at the corners, the first end and the second end being affixed at angles to the edges.

4. The apparatus of claim 1, wherein the carrier has a front, rear and sides, the strap being movable between a first longitudinal orientation for securing the carrier to a point on the vehicle to the front or rear of the carrier, and a second lateral orientation for securing the carrier to a point on the vehicle to the side of the carrier.

5. The apparatus of claim 4, wherein the strap is slidably attached to the loop intermediate the first and second ends thereof such that the strap may secure the carrier at the side or the front of the carrier.

6. The apparatus of claim 4, wherein the strap is slidably attached to the loop intermediate the first and second ends thereof such that the strap may secure the carrier at the side or the back of the carrier.

7. The apparatus of claim 1, wherein the loop extends diagonally across the surface of the carrier from the first end to the second end.

8. The apparatus of claim 1, wherein the first and second ends of the loop are affixed to the carrier by stitching.

9. The apparatus of claim 1, wherein the first and second ends of the loop are affixed to the carrier by fasteners.

10. The apparatus of claim 1, wherein the loop has a strap attachment area intermediate the first and second ends and is formed of a flexible material, the attachment area being folded upon itself with a first side of the attachment area being adhered to a second side of the attachment area for strengthening the strap attachment area.

11. The apparatus of claim 10, wherein the first side and the second side of the folded elongated piece are stitched together.

12. The apparatus of claim 1, wherein the loop has a strap attachment region intermediate the first and second ends, the strap attachment region longitudinally folded upon itself at least once so as to have two sides, the two sides affixed to each other.

13. The apparatus of claim 1, wherein the loop is formed from a textile.

14. The apparatus of claim 1, wherein the loop is molded from a hard rubber.

15. A cargo carrier for a vehicle, comprising:
   a front and a back, the carrier formed along a longitudinal axis between the front and the back, sides of the carrier disposed between the front and the back and laterally of the longitudinal axis, a wall of the carrier defining an external surface thereof;
   a plurality of elongate flexible loops each having first and second ends, each loop positioned on the wall laterally offset from the longitudinal axis and near the front or back of the carrier, for each loop, the first and second ends thereof affixed to the wall in spaced relation to each other; and
   for each loop, at least one strap secured to the loop intermediate the first and second ends thereof, the strap adapted to secure the carrier to the vehicle.

16. The carrier of claim 15, wherein the strap is slidably attached to the loop intermediate the first and second ends such that the strap may secure the carrier at the side or front of the carrier.

17. The carrier of claim 15, wherein the strap is slidably attached to the loop intermediate the first and second ends such that the strap may secure the carrier at the side or front of the carrier.

18. The carrier of claim 15, wherein the loop is formed from a textile.

19. The carrier of claim 15, wherein the loop is longitudinally folded at least once between the first and second ends.

20. The carrier of claim 15, wherein the wall has affixed thereto two loops near the front of the carrier and two loops affixed thereto near the back of the carrier.

21. The apparatus of claim 15, wherein one end of the loop is attached to a side of the carrier and the other end of the loop is attached to a front of the carrier.

22. The apparatus of claim 15, wherein one end of the loop is attached to a side of the carrier and the other end of the loop is attached to the back of the carrier.

* * * * *